US012037953B2

(12) United States Patent
Gonring et al.

(10) Patent No.: US 12,037,953 B2
(45) Date of Patent: Jul. 16, 2024

(54) MARINE PROPULSION AND GENERATOR SYSTEMS AND METHODS

(71) Applicant: Brunswick Corporation, Mettawa, IL (US)

(72) Inventors: Steven J. Gonring, Slinger, WI (US); Eric S. Mueller, Fond du Lac, WI (US); Michael J. Lemancik, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 5 days.

(21) Appl. No.: 17/540,912

(22) Filed: Dec. 2, 2021

(65) Prior Publication Data

US 2023/0175447 A1 Jun. 8, 2023

(51) Int. Cl.
*F02D 29/02* (2006.01)
*F01M 5/00* (2006.01)
(Continued)

(52) U.S. Cl.
CPC ............. *F02D 29/02* (2013.01); *F01M 5/001* (2013.01); *F01P 3/20* (2013.01); *F01P 7/14* (2013.01);
(Continued)

(58) Field of Classification Search
CPC .......... F02D 29/02; F02D 29/06; F02D 41/22; F01M 5/001; F01P 3/20; F01P 5/15; F01P 7/14; F01P 2050/02; F01P 2060/00
See application file for complete search history.

(56) References Cited

U.S. PATENT DOCUMENTS 4,708,669 A 11/1987 Kanno et al.
4,861,291 A 8/1989 Kioke
(Continued)

FOREIGN PATENT DOCUMENTS

AT 8288 U1 5/2006
DE 10 2009 002263 A1 10/2010
(Continued)

OTHER PUBLICATIONS

Gonring, "Marine AC Generator System and Method," Unpublished U.S. Appl. No. 16/922,782, filed Jul. 7, 2020.
(Continued)

*Primary Examiner* — John Kwon
*Assistant Examiner* — Johnny H Hoang
(74) *Attorney, Agent, or Firm* — Andrus Intellectual Property Law, LLP

(57) ABSTRACT

A marine propulsion system for a marine vessel includes an engine effectuating rotation of an output shaft, multiple batteries configured to power a marine vessel load, and an alternator having a rotor that is driven into rotation by the output shaft and that outputs a charge current to the batteries. The marine propulsion system further includes a control system configured to operate the engine in a propulsion mode and a generator mode. Upon receiving a generator mode command to start the engine in the generator mode, the control system operates the engine in accordance with a set of generator parameters to charge the batteries while a shift system of the marine propulsion system is locked in a neutral position such that the propulsor cannot be engaged and the marine vessel remains stationary.

22 Claims, 10 Drawing Sheets

(51) Int. Cl.

| | |
|---|---|
| ***F01P 3/20*** | (2006.01) |
| ***F01P 7/14*** | (2006.01) |
| ***F02D 17/02*** | (2006.01) |
| ***F02D 29/06*** | (2006.01) |
| ***F02D 33/00*** | (2006.01) |
| ***F02D 41/22*** | (2006.01) |
| ***F02P 5/15*** | (2006.01) |

(52) U.S. Cl.

CPC ............. *F02D 17/02* (2013.01); *F02D 29/06* (2013.01); *F02D 33/00* (2013.01); *F02D 41/22* (2013.01); *F02P 5/15* (2013.01); *F01P 2050/02* (2013.01); *F01P 2060/00* (2013.01); *F02D 2200/50* (2013.01)

(56) References Cited

U.S. PATENT DOCUMENTS

| | | | | |
|---|---|---|---|---|
| 5,234,363 | A | 8/1993 | Motose | |
| 6,188,139 | B1 | 2/2001 | Thaxton et al. | |
| 6,273,771 | B1 * | 8/2001 | Buckley | B63H 21/213 114/144 RE |
| 6,309,268 | B1 | 10/2001 | Mabru | |
| 6,342,775 | B1 * | 1/2002 | Sleder, Sr. | H02J 7/02 320/117 |
| 6,481,516 | B1 | 11/2002 | Field et al. | |
| 6,645,017 | B1 | 11/2003 | Skrzpek et al. | |
| 6,652,330 | B1 * | 11/2003 | Wasilewski | H02J 1/14 440/2 |
| 6,682,371 | B2 * | 1/2004 | Steinhauser | B63H 20/10 440/88 M |
| 6,802,749 | B1 | 10/2004 | Justus | |
| 6,846,207 | B2 * | 1/2005 | Motose | B63H 21/22 440/2 |
| 6,857,918 | B1 | 2/2005 | Lebreux et al. | |
| 7,028,650 | B2 | 4/2006 | Lewis et al. | |
| 7,862,393 | B2 | 1/2011 | Levander et al. | |
| 7,941,253 | B1 | 5/2011 | Brant | |
| 7,952,306 | B2 | 5/2011 | Wright et al. | |
| 8,062,081 | B2 | 11/2011 | Barrett et al. | |
| 8,118,627 | B2 * | 2/2012 | Wejrzanowski | B63H 21/17 322/58 |
| 8,215,283 | B2 | 7/2012 | Warchuck | |
| 8,552,682 | B2 | 10/2013 | Potter | |
| 8,725,329 | B1 | 5/2014 | Snyder et al. | |
| 8,812,224 | B1 | 8/2014 | Heitmann | |
| 9,028,285 | B2 * | 5/2015 | Tamba | B63H 23/16 440/3 |
| 9,054,555 | B1 * | 6/2015 | Ward | H02J 7/04 |
| 9,212,600 | B2 | 12/2015 | Sasaki et al. | |
| 9,382,855 | B2 * | 7/2016 | Fahringer | H02P 9/102 |
| 9,458,779 | B2 | 10/2016 | Brennan et al. | |
| 9,631,562 | B2 | 4/2017 | Sasaki et al. | |
| 9,975,619 | B1 * | 5/2018 | Gonring | H02P 9/48 |
| 10,097,125 | B2 | 10/2018 | Zook et al. | |
| 10,184,385 | B2 | 1/2019 | Apelsmeier et al. | |
| 11,040,762 | B2 | 6/2021 | Marquis et al. | |
| 11,381,103 | B2 * | 7/2022 | Gonring | F02N 11/0862 |
| 2008/0113569 | A1 | 5/2008 | Kaji | |
| 2008/0296976 | A1 * | 12/2008 | Wright | H02J 3/472 318/143 |
| 2009/0156068 | A1 | 6/2009 | Barrett et al. | |
| 2009/0176417 | A1 | 7/2009 | Rembach et al. | |
| 2010/0094490 | A1 | 4/2010 | Alston et al. | |
| 2010/0274420 | A1 * | 10/2010 | Veit | B63H 3/10 440/75 |
| 2011/0072792 | A1 * | 3/2011 | Bidner | F02D 41/029 60/296 |
| 2012/0028515 | A1 | 2/2012 | Stasolla et al. | |
| 2012/0083173 | A1 * | 4/2012 | McMillan | B63H 21/20 903/930 |
| 2012/0315809 | A1 | 12/2012 | Kuriyagawa et al. | |
| 2013/0325214 | A1 * | 12/2013 | Vos | B60W 20/13 903/903 |
| 2014/0149018 | A1 * | 5/2014 | Martin | F02D 41/009 701/102 |
| 2015/0066256 | A1 * | 3/2015 | Sako | F02D 41/2451 701/21 |
| 2017/0085394 | A1 * | 3/2017 | Schulz | H03K 19/21 |
| 2017/0174126 | A1 * | 6/2017 | Schmitt | B60Q 9/00 |
| 2017/0355258 | A1 | 12/2017 | Hawksley | |
| 2018/0037309 | A1 * | 2/2018 | Suzuki | F02D 41/021 |
| 2018/0155967 | A1 * | 6/2018 | Peng | E05B 81/64 |
| 2019/0390610 | A1 * | 12/2019 | Ulstad | F02D 17/02 |
| 2020/0150600 | A1 | 5/2020 | Ha | |
| 2021/0194269 | A1 | 6/2021 | Gonring | |

FOREIGN PATENT DOCUMENTS

| | | | |
|---|---|---|---|
| EP | 2082955 | A1 | 7/2009 |
| WO | 2008113999 | A1 | 9/2008 |
| WO | 2020054217 | | 9/2020 |
| WO | 2020187416 | | 9/2020 |

OTHER PUBLICATIONS

Gonring, "PCM Controlled Charging System," Unpublished U.S. Appl. No. 17/099,333, filed Nov. 16, 2020.

EP22210704.7, Extended EP Search Report dated May 2, 2023.

* cited by examiner

MARINE PROPULSION AND GENERATOR SYSTEMS AND METHODS

FIELD

The present disclosure generally relates to marine propulsion systems for marine vessels, and particularly to marine propulsion systems comprising one or more marine drives configured to operate to propel the marine vessel.

BACKGROUND

The following U.S. Patents are incorporated herein by reference, each in its entirety:

The disclosure of U.S. Pat. No. 6,273,771 is hereby incorporated herein by reference and discloses a control system for a marine vessel that incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

U.S. Pat. No. 7,941,253 discloses a marine propulsion drive-by-wire control system controls multiple marine engines, each one or more PCMs, propulsion control modules for controlling engine functions which may include steering or vessel vectoring. A helm has multiple ECUs, electronic control units, for controlling the multiple marine engines. A CAN, controller area network, bus connects the ECUs and PCMs with multiple PCM and ECU buses. The ECU buses are connected through respective isolation circuits isolating the respective ECU bus from spurious signals in another ECU bus.

U.S. Pat. No. 8,118,627 discloses a propulsion arrangement for a marine vessel. The propulsion arrangement comprises an engine for propelling the vessel and an electrical machine coupled to the engine. The electrical machine is arranged to supply onboard electrical power for the vessel. A control unit controls the electrical machine such that the electrical machine is selectively operable as a generator or a motor. The control unit and the electrical machine are arranged such that the electrical machine when operating as a motor can supplement the power of the engine while the engine is in operation. In one embodiment, the control unit and the electrical machine are arranged to provide active damping of the engine torque.

U.S. Pat. No. 10,097,125 discloses an alternator configured for use in a vehicle that includes a housing, a stator located within the housing, a field coil, a regulator, and a transceiver. The field coil is positioned in proximity to the stator and is configured for rotation relative to the stator. The regulator is electrically connected to the field coil and is configured to supply the field coil with an electrical signal based on a control signal. The transceiver is electrically connected to the regulator and is configured to wirelessly receive the control signal from an engine control module of the vehicle and to transmit the control signal to the regulator.

U.S. Publication No. 20210/194269 discloses a variable voltage charging system for a vehicle includes an alternator operatively connected to an engine and configured to alternately output at least a low charge voltage to charge a low voltage storage device and a high charge voltage to charge a high voltage storage device. A switch is configured to switch between connecting the alternator to the low voltage storage device and connecting the alternator to the high voltage storage device. A controller is configured to control operation of the alternator and the switch between at least a low voltage mode and a high voltage mode. In the low voltage mode, the alternator outputs the low charge voltage and the switch is connecting the alternator to the low voltage storage device. In the high voltage mode, the alternator outputs the high charge voltage and the switch is connecting the alternator to the high voltage storage device.

U.S. application Ser. No. 16/922,782 discloses marine AC generator system which includes a marine generator driven by an internal combustion engine and configured to generate an AC current and a rectifier configured to rectify the AC current to provide a DC current. At least one battery is configured to receive and be charged by the DC current. A battery powered inverter is configured to be powered by the at least one battery and to generate a variable current output frequency such that an AC electrical power is provided to a load when the marine generator is not running.

U.S. application Ser. No. 17/099,333 discloses a method of controlling an alternator in a marine propulsion system including receiving a demand value, wherein the demand value relates to an amount of output power produced by the engine that is demanded for propulsion of the marine vessel, and determining whether the demand value exceeds a demand threshold. The alternator is then controlled to reduce the charge current output to the battery and/or reduce a portion of engine output power from the engine that is utilized by the alternator when the demand value exceeds the demand threshold.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one embodiment, a marine propulsion system for a marine vessel includes an engine effectuating rotation of an output shaft, a battery configured to power a marine vessel load, and an alternator having a rotor that is driven into rotation by the output shaft and that outputs a charge current to the battery. The marine propulsion system further includes a control system configured to operate the engine in a propulsion mode and a generator mode. Upon receiving a generator mode command to start the engine in the generator mode, the control system operates the engine in accordance with a set of generator parameters to charge the battery while a shift system of the marine propulsion system is locked in a neutral position such that the propulsor cannot be engaged and the marine vessel remains stationary.

In one example, the marine propulsion system comprises a propulsion spark timing map associated with the propulsion mode and a generator spark timing map associated with the generator mode. Operating the engine in accordance with at least one of the set of generator parameters comprises operating the engine according to the generator spark timing map. In another example, the marine propulsion system comprises a propulsion fuel delivery map and a generator fuel delivery map associated with the generator mode.

Operating the engine in accordance with at least one of the set of generator parameters comprises operating the engine according to the generator fuel delivery map.

In another example, the engine comprises a plurality of cylinders, and operating the engine in accordance with at least one of the set of generator parameters comprises a cylinder deactivation pattern for the plurality of cylinders.

In another example, the cylinder deactivation pattern comprises a number of deactivated cylinders.

In another example, the cylinder deactivation pattern comprises locations of deactivated cylinders.

In another example, the control system is further configured to calculate operational hours of the marine propulsion device. In another example, the operational hours of the marine propulsion device comprises a sum of propulsion mode hours and discounted generator mode hours.

In another example, the marine propulsion system comprises a propulsion fault manager associated with the propulsion mode and a generator fault manager associated with the generator mode. Operating the engine in accordance with at least one of the set of generator parameters comprises operating the engine according to the generator fault manager.

In another example, the generator fault manager is configured to override a lever position fault response.

In another example, the marine propulsion system comprises a propulsion cooling system mode associated with the propulsion mode and a generator cooling system mode associated with the generator mode. Operating the engine in accordance with at least one of the set of generator parameters comprises operating the engine according to the generator cooling system mode.

In another example, the generator cooling system mode comprises deactivating at least one cooling passage within the engine.

In another example, the engine comprises an oil sump, and the generator cooling system mode comprises activation of an oil heater in the oil sump, or elsewhere in the lubrication system.

In another example, the marine propulsion system comprises a user input device that is communicably coupled to the control system. The command to start the engine in the generator mode is based on a user selection received at the user input device.

In another example, the command to start the engine in the generator mode is automatically generated based on an electrical power demand from the marine vessel load. In yet another example, the command to start the engine in the generator mode is automatically generated based on a low battery power condition in the battery.

In one embodiment, a method of method of operating a marine propulsion system for a marine vessel comprises providing a control system configured to operate an engine of the marine vessel in a propulsion mode utilizing a set of propulsion parameters to rotate a propulsor to propel the marine vessel and a generator mode in which the engine is operated using a set of generator parameters to charge at least one battery while the marine vessel remains stationary. The method further comprises receiving a generator mode command to start the engine in the generator mode and operating the engine in accordance with at least one of the set of generator parameters to charge at least one battery while a shift system of the marine propulsion system is locked in a neutral position such that the propulsor cannot be engaged and the marine vessel remains stationary.

In one embodiment, a marine propulsion system for marine vessel includes a battery configured to power a vessel load, a plurality of marine drives, and a control system. Each of the plurality of marine drives includes an engine effectuating rotation, an alternator having a rotor driven into rotation by the engine to output a charge current to the battery, and a propulsor selectively driven into rotation by the engine to propel the marine vessel. Each of the plurality of marine drives is configured to operate in a propulsion mode in which the engine is operated to rotate the propulsor to propel the marine vessel in a generator mode in which the engine is operated to charge the battery while the marine vessel remains stationary. The control system is configured to select a subset of the plurality of marine drives to be operated in the generator mode and then to operate the subset of marine drives in the generator mode to charge the battery while the marine vessel remains stationary.

In one example, the subset of the plurality of marine drives is selected based on a user input specifying at least one marine drive to be operated in generator mode.

In another example, the subset of the plurality of marine drives is selected based on a number of running hours for each of the plurality of marine drives.

In another example, the subset of the plurality of marine drives is selected based on a number of generator hours for each of the plurality of marine drives In another example, the subset of the plurality of marine drives is selected based on a fuel level for each of the plurality of marine drives In another example, the subset of the plurality of marine drives is selected based on a trim position of each of the plurality of marine drives.

In another example, the subset of the plurality of marine drives is selected based on an alternation pattern.

In another example, the subset of the plurality of marine drives is selected based on a fault status of each marine drive In another example, the control system is configured to determine a number of drives to include in the subset of the plurality of marine drives based on a current vessel load amount.

In one embodiment, a method of operating a marine propulsion system for a marine vessel includes providing a plurality of marine drives, each configured to operate in a propulsion mode in which an engine is utilized to move the marine vessel and in a generator mode in which the engine is utilized to charge the battery while the marine vessel remains stationary. Once a generator mode condition is detected triggering operation in the generator mode, a subset of the plurality of marine drives is selected. The subset of marine drives is then operated in the generator mode to charge the battery while the marine vessel remains stationary.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

Figure 1:
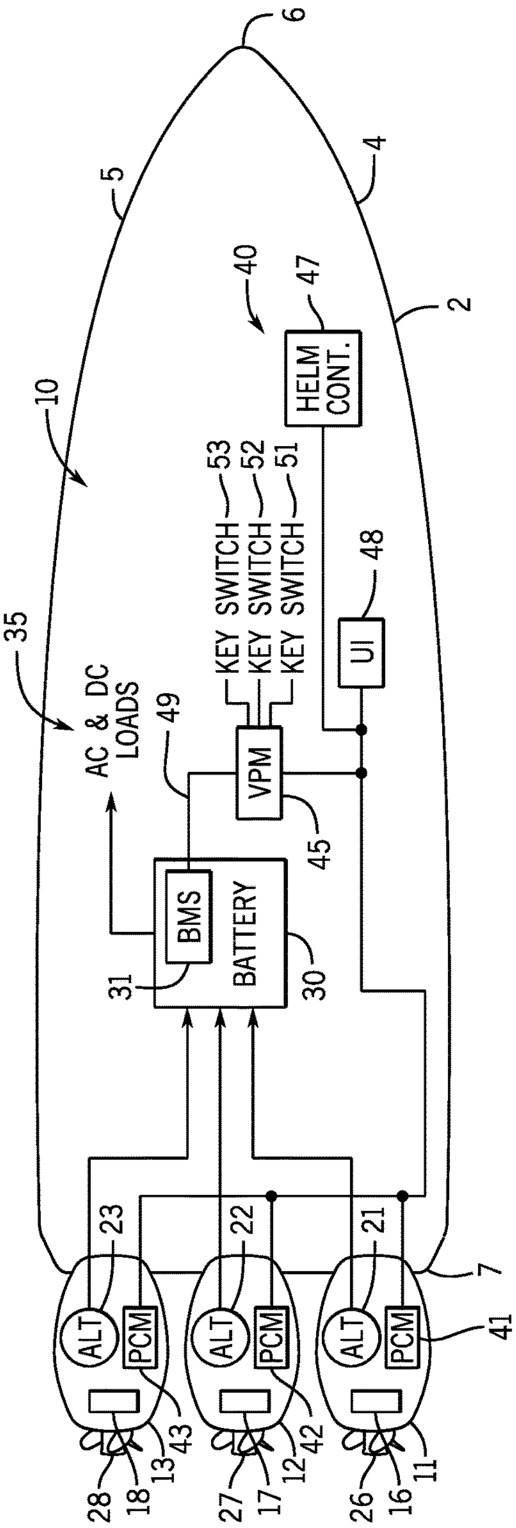
FIG. 1 is a schematic view of an exemplary marine propulsion system on a marine vessel in accordance with the present disclosure.

The present inventors have recognized that improved charging systems are needed for marine battery charging on marine vessels, and particularly for charging a "house battery" used for powering a house load on a marine vessel. In most marine propulsion systems, batteries on the marine vessel are charged by a propulsion engine in a marine drive only when the marine drive is in use to propel the marine vessel. Namely, the engine is operable to drive rotation of a propulsor, such as a propeller or impeller and also drives an alternator to charge the battery. Some prior art systems have battery monitoring that can alert an operator when a battery is low, allowing the operator to manually start the marine drives when battery charging is needed. The inventors have recognized that requirement of user attention and interaction to start the engines is burdensome and, because the user may fail to recognize or heed an alert, may result in loss of battery power due to the battery charge level becoming too low.

Some vessel systems include standalone generators configured to automatically start when power is needed. However, the inventors have recognized that standalone generators are not ideal for several reasons. Firstly, standalone generators typically supply AC power directly to loads and are not configured to charge batteries. So typically, the standalone generator remains running until the load is turned off. Standalone generators are loud and often emit odorous gasses and thus may disturb passenger's enjoyment. Furthermore, standalone generators occupy precious space on the marine vessel and require installation of additional electrical and fuel systems to support the standalone generator, often adding significant expense and complication to the marine vessel power system.

The inventors have recognized that standalone generators can be eliminated by utilizing the propulsion engines in the marine drive for the sole purpose of charging batteries without any propulsion generation. The inventors have recognized that adapting the propulsion engines to operate in generator mode for the sole purpose of charging the battery is beneficial in that it eliminates the need for a standalone generator, freeing up space on the marine vessel, reducing cost and installation requirements, etc. Moreover, utilizing the existing marine drives reduces problems relating to noise and fumes since the marine drives are already positioned to be isolated away from the passenger area of the marine drive. Marine drives are typically positioned at the rear of the marine vessel, such as mounted to the stern of the vessel in case of outboards. Thus, they are positioned away from the passenger area. Further, operating the marine drives in a generator mode, such as utilizing reduced fuel amounts and advanced spark timing, reduces carbon monoxide (CO) and other noxious gas emissions.

Accordingly, the inventors have recognized a need for marine drive systems and methods that operate in a propulsion mode to rotate the propulsor to propel the marine vessel and in a generator mode where propulsion is not effectuated and wherein the output of the engine is only utilized to charge one or more batteries on the marine vessel. The inventors have further recognized that the system can be configured to automatically start the engines in the generator mode upon detection of certain predefined conditions indicating need for the generator mode, such as low battery state of charge and/or the existence of a large electrical load.

Operating propulsion engines in a generator mode only to charge a battery results in significantly less load on the engine than when operated to generate propulsion. In generator mode, the engines are operated in low load and low RPM conditions where the alternator is the only load. Accordingly, the inventors have further recognized that, when operating the marine drive in the generator mode, one or more operation parameters should be modified to optimize operation of the marine drive for power generation. In the generator mode, operation parameters—such as spark timing maps, fuel delivery maps, cylinder activation patterns, engine RPM, and/or cooling system control—may be modified from those used in propulsion mode. Thereby, engine performance and/or operation of the entire marine drive system may be optimized for charging the battery. Additionally, in generator mode a shift system, or transmission, of the marine drive is locked in a neutral position so that the shift system cannot transition into gear and the propulsor cannot be engaged when the engine is operating in generator mode.

The inventors have further recognized that many marine vessels are equipped with multi-engine propulsion systems, and thus the system can be configured to provide variable charge current output. Large charge current output for fast charging can be made available by operating all or multiple engines at once in the generator mode to charge the battery. However, the inventors have recognized that it is not always necessary or desirable to start all the engines when operating in the generator mode. Accordingly, the disclosed system is configured to determine how many and which engines should be automatically started and stopped in generator mode in multi-engine propulsion systems. As disclosed herein, the system may be configured to execute different strategies for selecting a subset of marine drives from a plurality of available marine drives on the vessel to operate in the generator mode to charge the battery while the marine vessel remains stationary.

Various factors and inputs may be considered to optimize generator mode performance for maximizing efficiency and/or user experience, and/or minimizing or equalizing wear on the system. Various factors considered when selecting a subset of marine drives to operate in the generator mode may include engine running hours or other engine operation duration values, available fuel levels, fault detections, trim positions of the marine drives, and/or an electrical load amount (e.g., battery size, battery state of charge, electrical demand from house load, etc.). Alternatively or additionally, the system may be configured to select the subset of marine drives for operation in generator mode based on user input, such as user input specifying a drive preference for which drives are to be operated in the generator mode and/or specifying a charge mode for how charging operation should proceed. For example, the system may be configured such that the user can select a fast charge mode where the marine drives are operated to charge the battery quickly as possible. Alternatively or additionally, the system may be configured to enable the user to specify a quiet mode that minimizes the number of engines operated in generator mode and/or operates the engines to minimize noise generation, for example. Various other factors, parameters, and/or inputs may be utilized by the system to select the subset of marine drives for operation in the generator mode, which will be understood by a person having ordinary skill in the art in view of the present disclosure.

FIG. 1 depicts an embodiment of a marine propulsion system 10 having a plurality of marine drives configured to selectively operate in a propulsion mode and in a generator mode. The marine vessel 2 has starboard side 4, a port side 5, a bow 6 at the front, and stern 7 at the back. In the depicted embodiment, the vessel 2 is equipped with three marine drives 11-13, which are outboard marine drives mounted on the stern 7 and include a starboard marine drive 11, center marine drive 12, and port marine drive 13. In various embodiments, the marine drives 11-13 may be outboard drives, inboard drives, inboard/outboards or stern drives, jet drives, etc.

Each marine drive 11-13 includes an engine 16-18 configured to effectuate rotation of an output shaft that can be used to drive a propulsor 26-28, such as a propeller or impeller, and to drive a respective alternator 21-23. Each alternator 21-23 includes a rotor driven into rotation by the output shaft to generate a charge current to charge the battery 30. Each of the marine drives 11-13 is configured to operate in a propulsion mode in which each of the respective engines 13-16 are operated to rotate the propulsor 26-28 in addition to each alternator 21-23, in accordance with normal engine operation parameters optimized for generating marine propulsion. Each of the marine drives 11-13 is also configured to operate in a generator mode where the respective engine 16-18 is operated to just drive its associated alternator 21-23 while the shift system remains in a neutral position, and thus not rotating or engaging the propulsors 26-28.

When operating in generator mode, the engine 16-18 is controlled in accordance with a set of generator parameters that optimize performance and output for charging a battery 30. The set of generator parameters may include engine parameters such as spark timing, fuel timing and amount, piston operation, rotational speed, throttle valve position, and the like. The set of generator parameters may further include control parameters for other aspects of the marine drive 11-13, such as the cooling system and/or trim system, in order to optimize charge output to the battery 30. The set of generator parameters are thus optimized for the low RPM and low load conditions of driving the alternator and may also be configured to, for example, maximize charging efficiency, minimize emissions, and/or minimize charge time.

As described herein, the system 10 may further be configured to operate in various charging modes, each of which may be associated with a set of generator parameters. The system 10 may be configured to select one of the various charging modes based on user input or based on vessel conditions or factors, such as battery state of charge or vessel load amount. For example, the charging modes may include a fast charge mode where a set of generator parameters is configured to optimize engine output to charge the battery 30 as quickly as possible. Alternatively or additionally the charging modes may include a quiet mode or an efficiency mode where an associated set of generator parameters is configured to optimize system operation for minimizing noise and/or maximizing charging efficiency (such as charge output per unit fuel).

As used herein, the term "battery" refers to any of various types of electrical energy storage devices utilized on a marine vessel for powering an electrical load, such as one or more lead-acid batteries and lithium-ion (LI) batteries. Further, the term "battery" may refer to a single battery or battery pack or a plurality of batteries or battery packs, such as a battery bank. Thus, the battery 30 may be a single battery, such as a single lead acid or lithium-ion battery, or maybe a bank of such batteries. In the depicted example, the battery 30 includes a battery management system (BMS) 31 configured to determine a charge level (such as a state of charge) and overall condition of the battery 30. The BMS 31 may also be configured to monitor a charge output provided by one or more alternators 21-23 and power output to one or more power consuming devices on the marine vessel—together referred to herein as the vessel load 35. The BMS 31 is configured to communicate the battery charge level and load information within a control system 40, such as to a vessel power module (VPM) 45 configured to instruct and monitor generator mode operation.

The control system 40 includes multiple control modules, sensors, and user input elements communicatively connected together in order to effectuate system control. In the depicted example, the vessel power module (VPM) 45 communicatively connected to propulsion control module (PCM) 41-43 for each of the respective marine drives 11-13 and also to the BMS 31. The various control elements are communicatively connected by communication link 49, such as a CAN bus. To provide one example, the communication link 49 may be effectuated as a CAN Kingdom Network. Alternatively, the communication link 49 may be a wireless communication network according to any of various wireless communication protocols. The control system 40 configuration illustrated at FIG. 1 is merely exemplary and other control system configurations are within the scope of the present disclosure, including varied number of controllers and types of controllers.

One or more helm devices may also be configured to communicate with one or more control modules within the control system 40, such as via the communication link 49. A user interface 48 is configured to receive user input and/or provide notifications and information to the user regarding the propulsion system 10, and the charging and power storage operations in particular. The user interface 48 may include, for example, a digital display and user input element, such as a touch screen, at the helm of the marine vessel 2. For instance, the user interface 48 may comprise part of a VesselView® on board management system by Mercury Marine of Fond du Lac, Wisc. One or more helm control elements 47 may be configured to control throttle, shift, and steering of the marine drives 11-13. For example, the helm control elements 47 may include a throttle/shift lever for each of the marine drives 11-13, a steering wheel, a joystick, one or more trim switches for each of the marine drives 11-13, or the like. The steering and shift control system may be a digital control system, variously referred to as a drive-by-wire or digital-throttle-shift system, where communication between the helm control elements 47 and the steering and propulsion devices is effectuated by communication over the control system 40. A key switch 51-53 for each marine drive 11-13 provides user control of starting and stopping the marine drives. Each key switch 51-53 may be a three-position switch having an off position, an on position, and a crank position, as is typical. The position of each key switch 51-53 may be communicated directly to the VPM 45 or may be communicated indirectly via an intervening controller.

Each marine drive 11-13 has an associated controller, which in the depicted embodiment is a respective propulsion control module (PCM) 41-43. The PCM 41-43 is configured to track various values and statuses for the respective marine drive 11-13 and communicate those values and statuses within the control system via the communication link 49. For example, the PCM 41-43 may be configured to track running hours for each marine drive, which is the cumulative total amount of time that the engine 16-18 has operated (e.g., in the propulsion mode).

In certain embodiments, the PCM 41-43 may also be configured to separately track generator hours for the respective engine 16-18, which is the cumulative total amount of time that the respective engine 16-18 has been operated in the generator mode. Generator hours may be separately tracked from running hours because the amount of wear induced on the engine from a an hour of operating in the generator mode is significantly less than that from an hour of operating in the propulsion mode because of the light load and low RPM and the optimized generator parameters described herein. Alternatively, each PCM 41-43 may be configured to track generator operating hours as fractional running hours. For example, each hour of operation in generator mode may count as a fraction of a running hour in the propulsion mode, such as half or one-tenth of a running hour.

The PCMs 41-43 are further configured to track fault conditions that may occur related to the respective engines 16-18 or related to other systems in or associated with the marine drives 11-13. Various fault conditions associated with marine drives and with other aspects of the propulsion system 10 are known to a person having ordinary skill in the art.

One or more fuel tanks are associated with the marine drive 11-13. In certain embodiments, each marine drive 11-13 may have a separate fuel tank associated therewith storing and supplying fuel for the respective engine 16-18. In such an embodiment, each PCM 41-43 receives a fuel level value from one or more sensors within the fuel tank and may be configured to indicate a current fuel level for the respective marine drive 11-13 via the communication link 49 to the VPM 45. Alternative fuel storage arrangements, such as shared fuel tanks, are also within the scope of a present disclosure, such as a fuel tank shared between two or more marine drives 11-13. Additionally, fuel level values may be obtained and communicated by other communication paths, such as communicated directly from the fuel sensor within each fuel tank to the VPM 45 via the communication link 49.

The VPM 45 is configured to receive the various measurements, parameters, and information about the propulsion system 10 and to control generator mode operation accordingly. The VPM 45 is also configured with system setting information, such as which marine drives 11-13, if not all, are configured to operate in the generator mode. In certain embodiments, only a portion of the marine drives 11-13 installed on the marine vessel may be configured or available to operate generator mode accordingly.

The control system 40 may be configured automatically start one or more of the marine drives 11-13 in the generator mode upon detection of a condition indicating that charging output is needed or preferable, referred to herein as a generator mode condition. For example, detection of the generator mode condition may be based on battery charge level, such as battery state of charge, of the marine battery 30 and/or detection of a threshold vessel load 35 indicating high power consumption. Thus, the one or more marine drives 11-13 may be started in the generator mode upon detection of a low battery charge level (e.g., low battery state of charge) or upon detection of a large load demand, such as due to operation of one or more large load devices. Alternatively or additionally, the generator mode condition may include detection of one or more user inputs, such as a user input to operate the system in generator mode to charge the battery 30. For example, the user may have a preference to top-off the battery 30 at a convenient time so that the generator mode does not kick on during an undesired time, such as at night or other quiet time. The system may be configured to receive a user input to start the generator mode, or may be configured to operate the generator mode according to a user-set schedule, such as to avoid operation of the generator mode during pre-set quiet periods and to operate the generator mode in advance of a scheduled quiet period to top off the battery.

Figure 2:
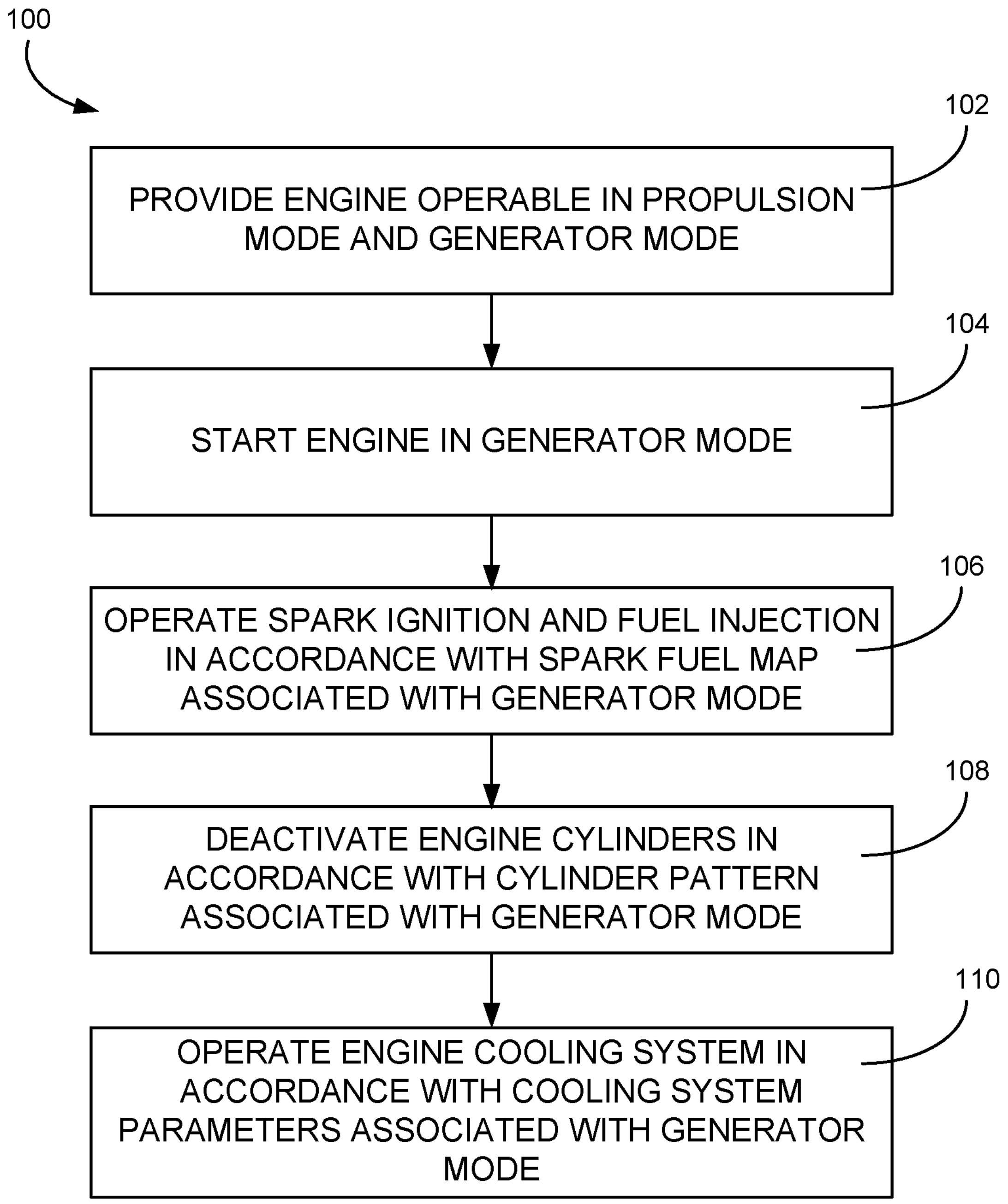
FIGS. 2-11 are flow charts depicting exemplary methods of operating a marine propulsion system in a generator mode in accordance with embodiments of the present disclosure.

Referring now to FIG. 2, a process 100 is depicted for operating the one or more engines of the marine vessel in a generator mode, as opposed to a propulsion mode. Accordingly, step 102 of process 100 includes providing engines 16-18 on the marine vessel 2 that are operable in both the propulsion mode and the generator mode. As described above, in the propulsion mode, each engine 16-18 is intended to be used to move the marine vessel 4. This is the engine's primary mode of operation, and the engine parameters (described in further detail below) are optimized for moving the marine vessel. By contrast, in the generator mode, the engine parameters are optimized for the purpose of charging battery 30 that provides electrical power to various house load elements and systems (e.g., air conditioners, refrigerators) of the marine vessel 2 while the marine vessel 2 remains stationary and a shift system of the remains in a neutral position, and thus not rotating or engaging the propulsors 26-28

Past systems have utilized standalone gasoline or diesel-powered generators to provide this power while away from access to shore power. However, the present inventors have recognized that these generators have numerous drawbacks, including the loud noises they create and the space they consume in the bilge or below the deck of the marine vessel. In addition, generators are difficult to install and maintain. Replicating the functions of marine vessel generators with marine drives that are already installed on the marine vessel therefore provides numerous advantages.

At step 104, the PCM 41-43 instructs each respective engine 16-18 to start in generator mode, and thus, to implement the engine parameters associated with the generator mode. As described in further detail below with reference to FIG. 3, in some embodiments, the instruction to start one or more of the engines 16-18 in generator mode may be based on a command initiated by an operator to start the one or more engines 16-18 in generator mode. In other embodiments, the instruction to start the engines 16-18 in generator mode may be automatically generated by a systems control module (e.g., VPM 45, BMS 31) based on the demands and characteristics of the system.

At step 106, the PCM 41-43 retrieves and implements spark ignition and fuel injection in accordance with a spark timing map and/or a fuel delivery map that is tailored to the generator mode. Because the mechanical load on each of the engines 16-18 is much lower in the generator mode as compared with the propulsion mode, it is beneficial to use different spark and fuel calibrations to improve running quality and fuel efficiency. The mapped parameter values in the spark timing map and/or the fuel delivery map can include, but are not limited to, amount of fuel per cylinder (FPC), a throttle position setpoint (TPS), spark plug activation timing. For example, the generator mode map may command a lower FPC, which results in less fuel in the combustion chamber. Lowering the FPC results in reduced fuel usage and emissions (e.g., 10% of average emissions generated when the engine is operating in propulsion mode). These reductions lead to overall safer operation of the marine vessel 2.

At step 108, the PCM 41-43 deactivates engine cylinders in accordance with a cylinder deactivation pattern that is associated with the generator mode. Each of the cylinders of the engine 16-18 may be configured as is standard in the art (i.e., within each cylinder, a piston is disposed for reciprocating movement and is attached to a crankshaft). Deactivation of a cylinder means that fuel is not delivered to the cylinder and that the sparkplug located within the combustion chamber of the cylinder does not ignite. As described above, since the mechanical load on the engine 16-18 is lower, rather than operate with the full number of cylinders, the engine 16-18 may instead operate with less than the full number of cylinders while in generator mode. For example, rather than operate with the six or eight cylinders that constitute the full number of cylinders, the engine 16-18 operating in generator mode may instead only utilize two cylinders. The cylinder deactivation pattern commanded by the PCM 41-43 may include not only the number of cylinders to be deactivated, but the positions or locations of the cylinders within the engine 16-18 as well. In other words, the cylinder deactivation pattern may ensure that the positions of the deactivated and operational cylinders rotate each time generator mode is commanded in order to ensure that each of the cylinders experiences approximately equal wear and tear from operation during generator mode. Advantageously, deactivating engine cylinders results in a reduction in both the noise and emissions generated by the engine 16-18, thereby improving the passenger experience on the marine vessel 2.

At step 110, the PCM 41-43 operates the engine cooling system in accordance with cooling system parameters associated with the generator mode. When an engine 16-18 is operating in propulsion mode, the heat generated by the engine 16-18 is sufficient to evaporate water that is trapped in the oil. However, while operating in generator mode, the engine 16-18 may operate at a lower speed that is insufficient to result in this evaporation. Accordingly, the one or more engines 16-18 of the marine vessel 2 may include oil heaters within the oil sump or elsewhere in the lubrication system that are activated by the propulsion control module when the engine is in generator mode to encourage water evaporation. In an exemplary embodiment, the oil heaters may be installed in the oil sump, outside the oil sump in a manner that sinks heat into the oil sump housing, or in the oil filter base.

Although FIG. 2 depicts steps 106-110 occurring sequentially, in other embodiments, steps 106-110 may be performed in a different order or simultaneously. In still further embodiments, one or more of steps 106-110 may be omitted from process 100.

Figure 3:
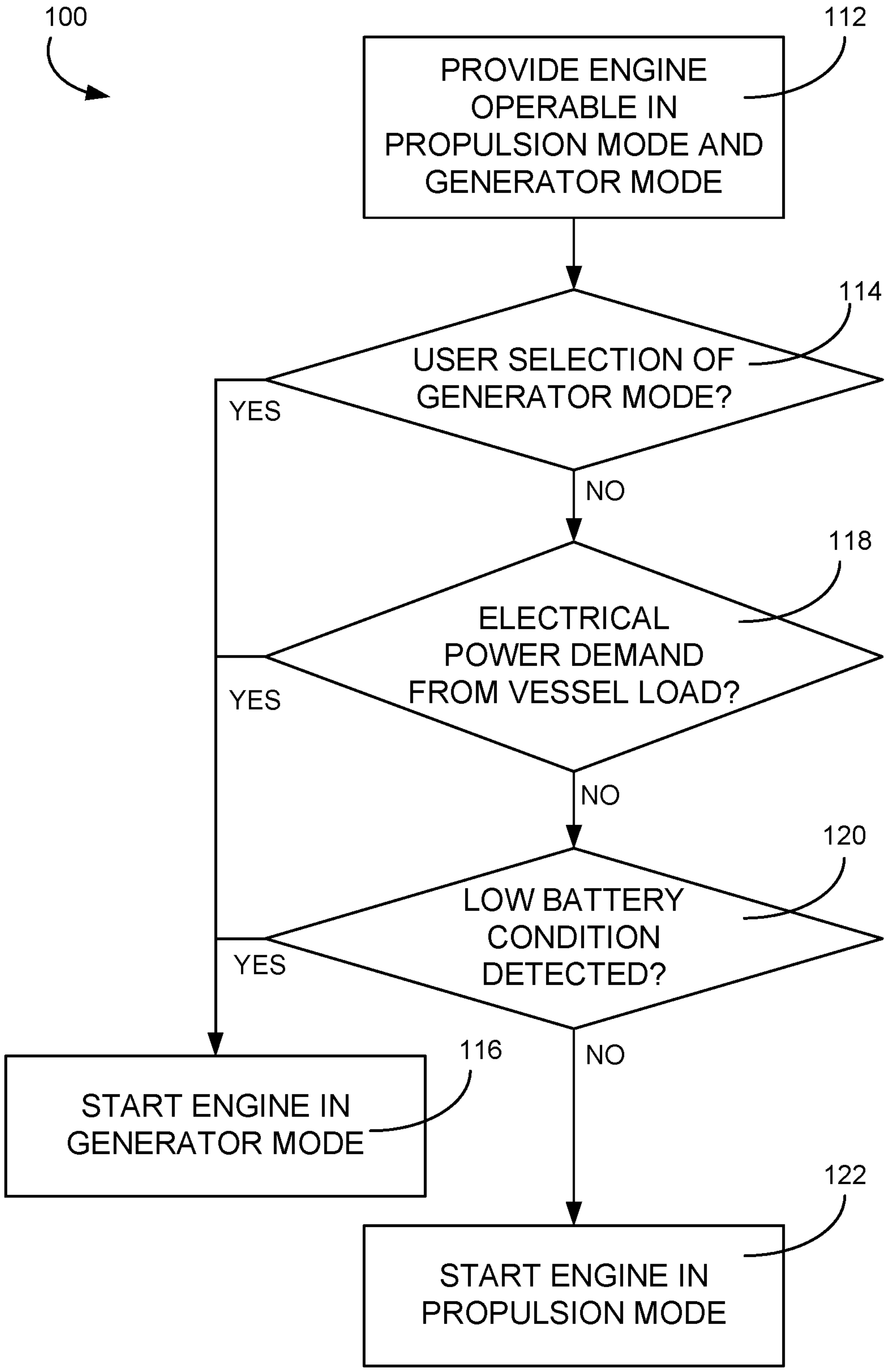

Turning now to FIG. 3, a portion of the process 100 for determining whether to operate the engines 16-18 in propulsion mode or generator mode is depicted. In an exemplary embodiment, process 100 may be performed by each PCM 41-43 located in each marine drive 11-13. In other embodiments, process 100 may be performed by a supervisory propulsion controller (e.g., VPM 45) that transmits instructions to the individual marine drives 11-13.

The portion of process 100 depicted in FIG. 3 commences with step 112, in which one or more marine drives 11-13 operable in both a propulsion mode and a generator mode are provided on a marine vessel 2. At step 114, the PCM 41-43 determines if an operator has specifically commanded that the one or more engines 16-18 start in generator mode, for example, by selecting the option via user interface 48 provided on the helm of the marine vessel. In an exemplary embodiment, the command received at the user interface 48 may be transmitted to the propulsion control module via the CAN bus. If the PCM 41-43 determines that the operator has manually selected operation in generator mode using information contained within the start request messaging, process 100 advances to step 116 and starts the one or more engines 16-18 in generator mode. Starting the engine 16-18 in generator mode comprises the utilization of various engine parameters associated with the generator mode, as described above with reference to FIG. 2 and FIGS. 4-5 below.

If, however, the PCM 41-43 has not received a manual command to start the one or more engines 16-18 in generator mode, process 100 advances to step 118, in which the PCM 41-43 detects whether VPM 45 has requested that the one or more engines 16-18 start in generator mode, for example, due to a magnitude of an electrical power load demanded by vessel systems. In an exemplary embodiment, the command automatically generated by the VPM 45 may be transmitted to the propulsion control module via the CAN bus. If the PCM 41-43 determines that the VPM 45 has requested that the one or more engines 16-18 start in generator mode using information contained within the start request messaging (e.g., the start request is labeled "generator start request"), process 100 advances to step 116 and starts the one or more engines 16-18 in generator mode.

Returning to step 118, if the PCM 41-43 has not received a command from the VPM 45 to start the one or more engines 16-18 in generator mode based on the magnitude of a system electrical power load, process 100 advances to step 120 in which the VPM 45 determines whether a low battery condition has been detected. For example, if one or more of the batteries 30 included in the battery bank drops below a low charge threshold (e.g., 10% of full charge) as detected by a state of charge sensor of the BMS 31, a vessel power module can automatically transmit a command to start the one or more engines 16-18 in the generator mode to charge the one or more batteries 30. In an exemplary embodiment, the command automatically generated by the VPM 45 may be transmitted to the PCM 41-43 via the CAN bus. If the PCM 41-43 determines that the VPM 45 has requested that the one or more engines 16-18 start in generator mode due to a low battery condition, process 100 advances to step 116 and starts the one or more engines 16-18 in generator mode.

If however, the PCM 41-43 has not received a command to start in generator mode due to a low battery condition, the portion of process 100 depicted in FIG. 3 terminates at step 122, in which the one or more engines 16-18 start in propulsion mode. Notably, at any point within the process 100 depicted in FIG. 3, an operator may override a command from the PCM 41-43 to start the one or more engines 16-18 in generator mode by keying the ignition system, or otherwise making a request to start the one or more engines 16-18 in propulsion mode.

Figure 4:
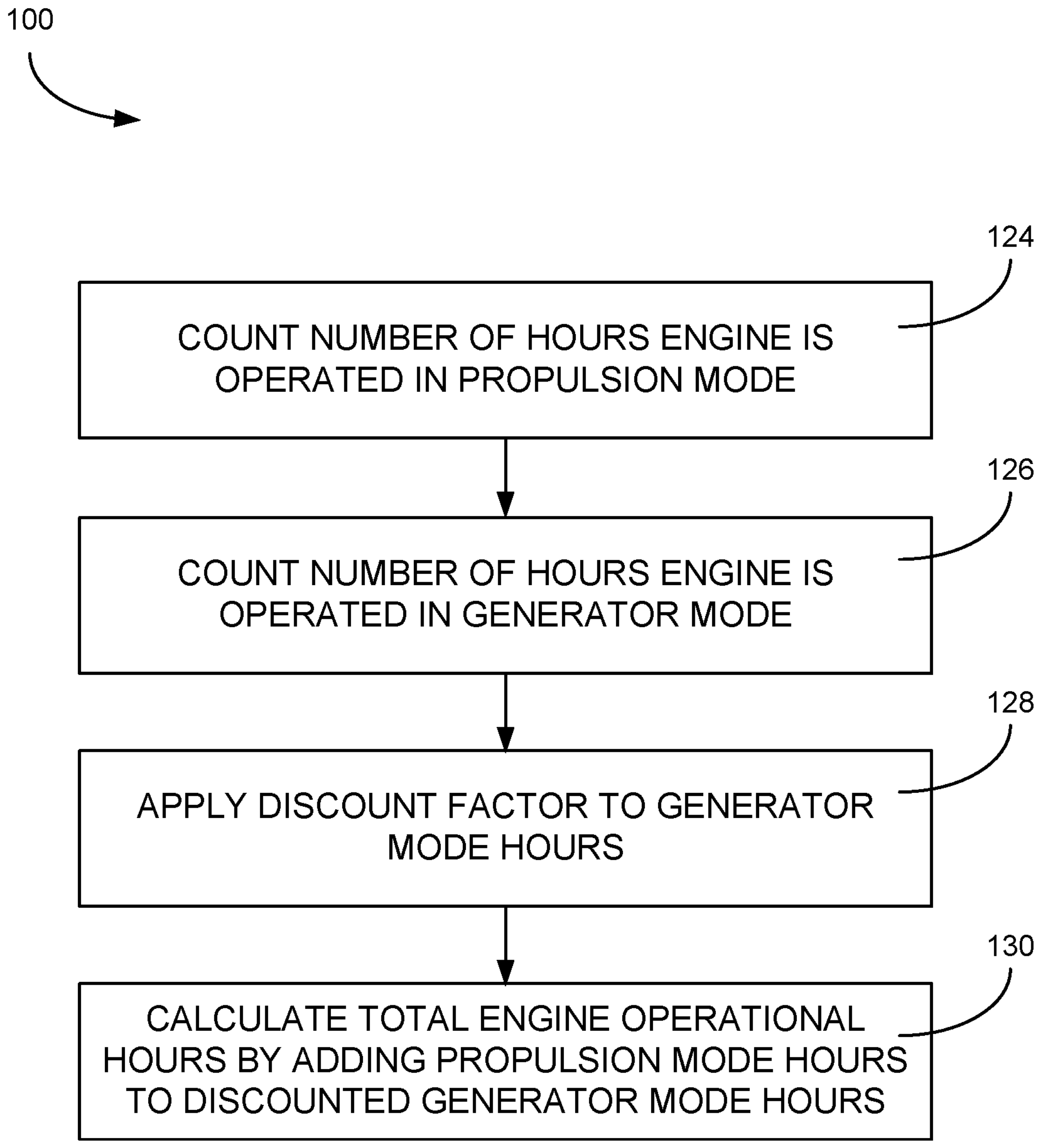

FIG. 4 depicts a portion of process 100 for calculating the operational hours of an engine 16-18 that is operable in both propulsion and generator modes. Since the mechanical load on the engine 16-18 is much lower when operating in generator mode, compensating for this reduction can provide a more accurate representation of the life of the engine 16-18 for maintenance or warranty purposes. For example, compensation for the reduction in wear due to operation in generator mode may lengthen the service intervals calculated by the PCM 41-43 for the alternator belt and the engine oil. In an exemplary embodiment, the portion of process 100 depicted in FIG. 4 is performed by the PCM 41-43 located in each marine drive 11-13. In other embodiments, process 100 may be performed by a supervisory controller (e.g., VPM 45) that is communicatively coupled to each of the propulsion units.

FIG. 4 commences with step 124, in which the PCM 41-43 counts or retrieves from memory the number of hours that the engine 16-18 has operated in the propulsion mode, that is, with the propulsor 26-28 operational to move the marine vessel 2.

At step 126, the PCM 41-43 counts or retrieves from memory the number of hours that the engine 16-18 has operated in the generator mode. At step 128, the PCM 41-43 applies a discount factor to the generator mode hours. In an exemplary implementation, the discount factor for a generator mode hour may be 90% or more as compared with a propulsion mode hour. For example, if the engine 16-18 has operated in generator mode for 100 hours, the PCM 41-43 may multiply these hours by 0.1 for a result of 10 hours. This is representative of the fact that an hour operating in generator mode may be equivalent to only 10% of the expected wear on the engine 16-18 operating for an hour in propulsion mode.

FIG. 4 concludes with step 130, in which the propulsion mode hours of step 124 are added to the discounted generator mode hours of step 128 to calculate the total engine operational hours. In an exemplary embodiment, this total is viewable by an operator on the user interface device 48.

Figure 5:
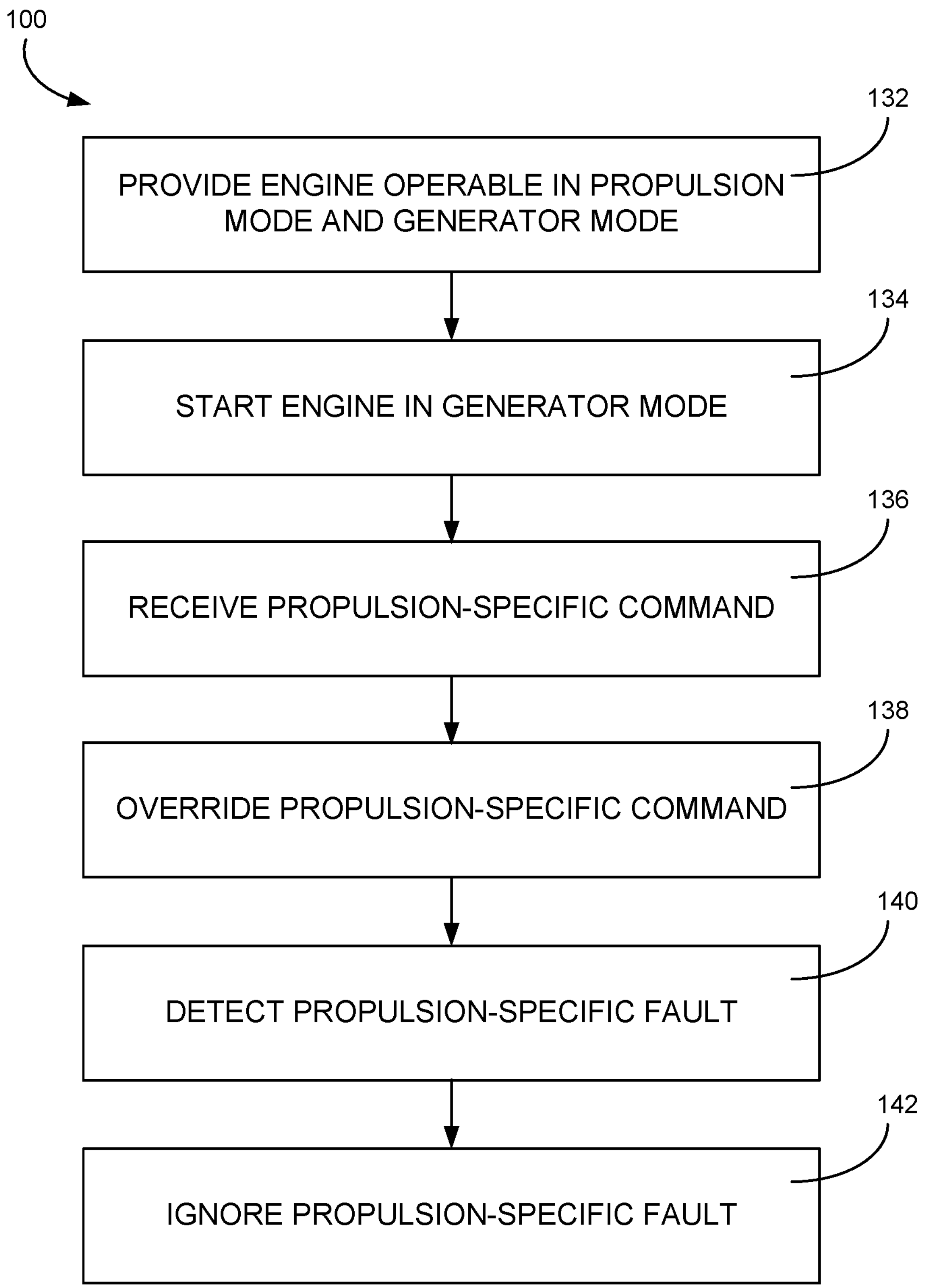

Referring now to FIG. 5, a portion of process 100 is depicted for operating the one or more engines 16-18 of the marine vessel 2 in a generator mode when a propulsion command or fault is received by the PCM 41-43. FIG. 5 commences with step 132, in which one or more engines 16-18 operable in both a propulsion mode and a generator mode are provided on a marine vessel 2. At step 134, the engine 16-18 is started in generator mode. As depicted in FIG. 3, the command to start the engine in generator mode can be either manually or automatically generated based on operator desires and the demands of the marine vessel systems.

At step 136, the PCM 41-43 receives a propulsion-specific command. For example, the PCM 41-43 may receive a command from a digital throttle shift (DTS) system to modify a throttle position. Responsive to step 136, process 100 advances to step 138, and the PCM 41-43 overrides the propulsion-specific command. For example, while operating in the generator mode, the propulsor 26-28 of the marine vessel 2 may be disengaged such that the engine 16-18 is in a neutral position and thus not rotating or engaging the propulsors 26-28. In some embodiments, the disengagement of the propulsor 26-28 may be accomplished via a mechanical locking device. In other embodiments, the disengagement is accomplished via an electronic locking command stored in the DTS. Other propulsion-specific commands that are overridden at step 138 may include throttle and shift commands from a joystick and/or electronic remote control (ERC).

At step 140, the PCM 41-43 detects a propulsion-specific fault. For example, various propulsion-specific faults include, but are not limited to, spark fuel faults, propellor or propulsor faults, and lever position faults in which the RPM output of the engine does not correspond to a control lever position. FIG. 5 concludes at step 142, in which the PCM 41-43 ignores the propulsion-specific fault, and does not command a response that would otherwise occur if the fault was generated while the engine 16-18 was operating in propulsion mode. Although FIG. 5 depicts steps 132-142 occurring sequentially, in other embodiments, steps 132-142 may be performed in a different order or simultaneously. In still further embodiments, one or more of steps 132-142 may be omitted from process 100.

When operating in the generator mode, it may be desirable in many circumstances to operate a subset of the plurality of marine drives 11-13 installed on the marine vessel in the generator mode. For example, it may not always be necessary to start all of the engines 15-18 in order to provide the necessary or desired electrical power output. Therefore, the inventors have recognized that a strategy is needed for determining which engine or engines of the plurality of engines 16-18 installed on the marine vessel are available and should be started in the generator mode.

As disclosed herein, the selection of the subset of marine drives for operation in the generator mode may consider multiple factors and/or user inputs. The user interface 48, helm controllers 47, and/or key switches 51-53 may be utilized by an operator to provide input specifying a drive preference and/or a mode of operation for the generator mode. For example, the user input may be provided to select a default engine or engines from the plurality of engines 16-18 for use in the generator mode. Similarly, the system may be configured to allow user selection of a number of drives to include in the subset for operation in the generator mode, or otherwise to specify a mode of operation, such as a fast charge mode where minimizing charge time is prioritized or a quiet charge mode where minimizing noise generation is prioritized. The system is then configured to select the subset of the plurality of marine drives 11-13 to be operated in the generator mode in accordance with the user input.

Alternatively or additionally, the control system 40 may be configured to select the subset of marine drives in consideration of one or more factors, such as a number of running hours and/or generator hours for each of the marine drives 11-14, fuel levels associated with each of the marine drives 11-14, an alternation pattern for operating the marine drives 11-13 in the generator mode, a trim position of each of the marine drives 11-13, and/or an electrical load on the battery 30. In various embodiments, the control system 40 may be configured to select the subset of the plurality of marine drives 11-13 for operation in the generator mode to optimize one or more aspects of charging, such as efficiency (maximizing charge output per unit fuel), minimizing noise, minimizing emissions, maximizing fuel supply, extending the life of one or more of the marine drives 11-13, and/or equalizing wear across the drives.

Figure 6:
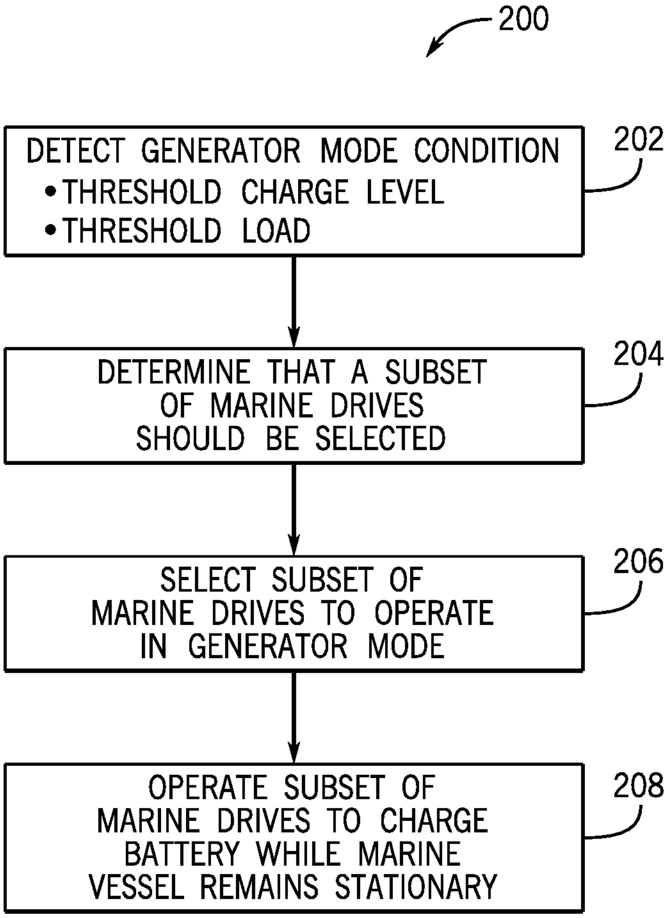
Figure 7:
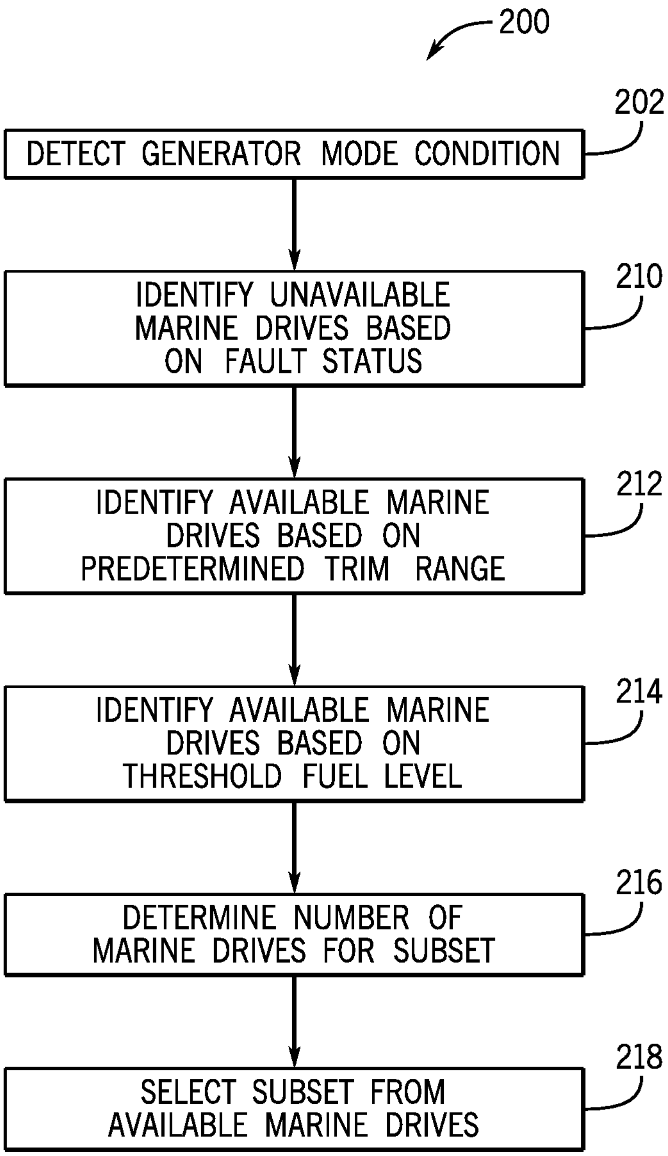

FIGS. 6-11 depict exemplary embodiments of control methods involving selection of a subset of the plurality of marine drives 11-13 to be operated in the generator mode to charge the battery 30 while the marine vessel remains stationary. FIG. 6 depicts one embodiment of the method 200 of initiating generator mode operation for a marine propulsion system 10. Once the generator mode condition is detected at step 202, the control system 40 selects the marine drives that will be operated in the generator mode. Various generator mode conditions for triggering the start of generator mode operation are described above. A determination is made at step 204 that a subset of the marine drives should be selected. For example, selection of a subset of the marine drives may be appropriate when the needed electrical power can be provided by fewer than all of the engines 16-18. A subset of the marine drives 11-13 installed on the marine vessel are selected at step 206 for generator mode operation. The subset includes at least one, but not all, of the marine drives 11-13. The selected subset of marine drives is then operated in the generator mode at step 208 to charge the battery 30 while the marine vessel remains stationary. Various embodiments of operating each marine drive 11-13 in the generator mode are described above.

Various methods may be executed accounting for different parameters, factors, and inputs when selecting the subset of marine drives. FIGS. 7-11 depict exemplary embodiments for determining which marine drive 11-13 should be included in the subset. In the example at FIG. 6, the method 200 includes detection of the generator mode condition at step 202, as described above, and then identifying which marine drives are available for operation in the generator mode. For example, such steps may be executed by the VPM 45 based on information received from various elements within the system 10. Step 210 is executed to identify unavailable marine drives based on fault status—e.g., whether a fault has been detected indicating that operation of the marine drive 11-13 in the generator mode should be avoided. For example, one or more of the marine drives 11-13 may be deemed unavailable if a fault has been generated relating to the respective engine 16-18. The controller 45 may be configured to ignore other types of faults, such as faults relating to steering, trim, helm control, transmission, propulsor, etc. namely, the control system 40 may be configured to ignore faults relating to portions of the system that are not utilized in the generator mode where the marine drives 11-13 are operated to only provide a charging output and not the effectuate propulsion. In certain embodiments, if a fault status is generated that prevents the marine drive 11-13 from being utilized in propulsion mode but does not impact operation in the generator mode, then that marine drive may be marked as preferable for operation in the generator mode.

Further, steps may be taken to identify those marine drives that are available for operation in the generator mode. In the depicted example, step 212 is executed to identify available marine drives based on the trim position of each marine drive 11-13. Trim systems are well known in the relevant art, where marine drives can be rotated around a trim axis to adjust the angle of the propeller force with respect to the vessel 2. Many systems are configured such that the marine drives 11-13 can be trimmed up out of the water, such that the base of the marine drive, including the propulsors 26-28 are not in the water. Where the marine drive is a water-cooled drive and cooling the engine 16-18 requires circulating raw water from the surrounding body, operating the marine drive 11-13 when it is trimmed up out of the water can cause overheating the engine. This applies to outboard drives in particular, where the entire drive including the cooling water intake can be trimmed out of the water. Accordingly, the control system 40 may be configured to designate marine drives as available for operation in the generator mode when they are in a trim position that allows proper function of the cooling system. Namely, the control system 40 may be configured to verify that that the trim position of each of the marine drives 11-13 is within a predetermined acceptable trim range for that marine drive 11-13 indicating that the water intake for the cooling system is under the water line. To provide one example, the predetermined trim range may be between a minimum trim position, or full tuck, and a threshold trim position of 20 degrees where the water intake could be out of the water.

The control system 40 may further be configured to identify available marine drives based on fuel level, as represented at step 214. One or more fuel tanks, or fuel storage devices, are configured to supply fuel to the plurality of marine drives 11-13. Where the system includes two or more fuel tanks, each supplying fuel to only a sunset of the marine drives, the system may be configured to consider fuel level in determining which of the marine drives 11-13 to operate in the generator mode. For example, the control system 40 may be configured to utilize the marine drive(s) 11-13 with access to the largest fuel supply for operation in the generator mode, or alternatively to avoid using the marine drive(s) with the least amount of remaining fuel. In the example at FIG. 7, available marine drives are identified as marine drives 11-13 with at least a threshold fuel level. The threshold fuel level may be a relative threshold (e.g., at least a threshold percent of the maximum measured fuel level between the plurality of fuel tanks) or may be a fixed threshold (e.g., to avoid operating any marine drive in the generator mode if the remaining fuel amount is less than threshold percent of the maximum fuel capacity of the respective tank).

Figure 8:
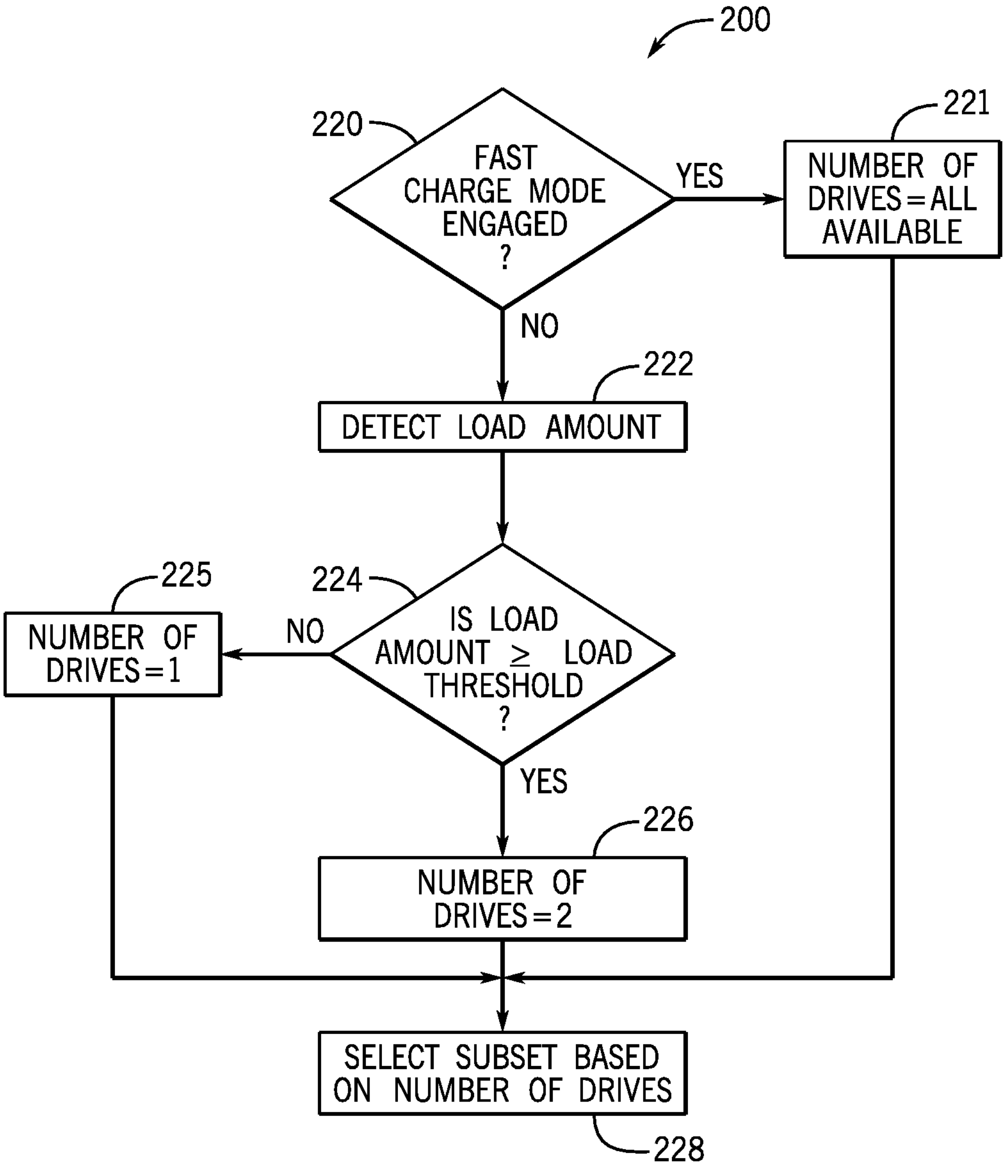

Steps may be executed to determine the number of marine drives that should be included in the subset, as represented at step 216. Various factors may be considered in determining the number of marine drives to include in the subset, such as user input regarding charge mode or drive preference, a detected load amount, and/or the number of available drives. Other factors, such as the overall fuel storage and availability, may also be considered. FIG. 8 depicts one exemplary method for determining the number of marine drives for the subset. The marine drives 11-13 to be included in the subset are then selected at step 218 from the available marine drives, which includes identification of the number of marine drives identified at step 216.

FIG. 8 depicts one embodiment of steps for determining a number of marine drives to include in the subset based on user input and vessel load. The system may be configured to allow a user to select a number of marine drives to be utilized, in which case the user selection will dictate the number of marine drives for the subset. In other embodiments, user input may dictate an operation mode impacting the number of marine drives to be selected. For example, the control system 40 may be configured to be selectively operable in a quiet mode where only one or a minimum number of drives is utilized. Alternatively, the system may be configured to be selectively operable in a maximum efficiency mode, where only the most efficient marine drive is operated in the generator mode to charge the marine battery. Alternatively or additionally, the system 10 may be configured to receive user input and effectuate a fast charge mode dictating operation of all available marine drives 11-13 to maximize charge output and minimize charge time. Such an embodiment is depicted at FIG. 8, where step 220 is executed to determine whether the fast charge mode is engaged. If so, then all available marine drives are selected at step 221, such as all of the available drives based on fault status, trim, and fuel level. In such an example, the "subset" may include all marine drives 11-13 on a marine vessel if all are available.

If the fast charge mode is not engaged, then steps may be executed to determine the number of marine drives to be included in the subset based on the current vessel load 35—i.e., amount of power demanded from the battery 30. The current vessel load amount may be measured, for example, by the BMS 31 and communicated to the VPM 45 to detect the load amount at step 222. If the current vessel load amount is less than a load threshold at step 224, then only a single marine drive is needed, and the number of marine drives is set to one at step 225. If the detected vessel load amount exceeds the load threshold at step 224, then the number of marine drives is set to two. In various embodiments, multiple load thresholds may be provided depending on the number marine drives available, the power output of each, etc. The subset is then selected at step 228 to include the determined number of marine drives.

Figure 9:
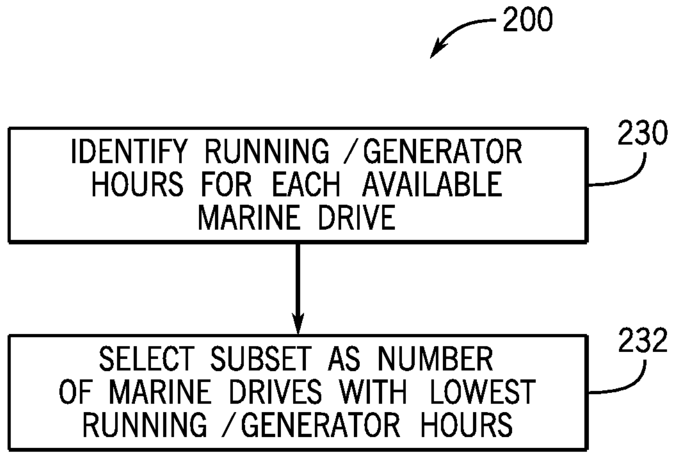

FIG. 9 depicts an embodiment of the method 200 wherein selection of the subset is based on running hours and/or generator hours for each available marine drive from the plurality of marine drives 11-13. The number of running hours and/or generator hours is identified for each marine drive at step 230. In certain embodiments, the control system 40, such as each PCM 41-43, is configured to separately track the time that the engine 16-18 runs in generator mode to charge the battery 30. In other embodiments, the control system 40 may only be configured to track one operating time value and may be configured to discount the time operated in generator mode compared to operation in propulsion mode. For example, one hour of operation in generator mode may be weighted as 50% or less of an hour operating in propulsion mode. In a further example, a generator mode hour may be weighted as 10% or as 20% of an hour operating in propulsion mode.

The control system 40 may be configured to select the subset based on the running and/or generator hours. In the example step 232, the number of marine drives with the lowest running and/or generator hours are selected. In various examples, this may be selection of the number of marine drives with the lowest number of running hours, the lowest number of generator hours, or the lowest combined hours. The goal of such a strategy is to keep the running and/or generator hours approximately even across the set of marine drives 11-13 so that the wear and service needs are approximately the same.

Alternatively, the control system 40 may be configured to weigh the running and/or generator hours as one factor in selecting the subset. For example, the system may be configured to eliminate from selection any marine drive with a total number of running and/or generator hours that significantly exceeds that of the other marine drives, such as more than a threshold number of hours greater than the other marine drives. The goal of such an embodiment would be to avoid overtaxing one marine drive 11-13 compared to the others.

Figure 10:
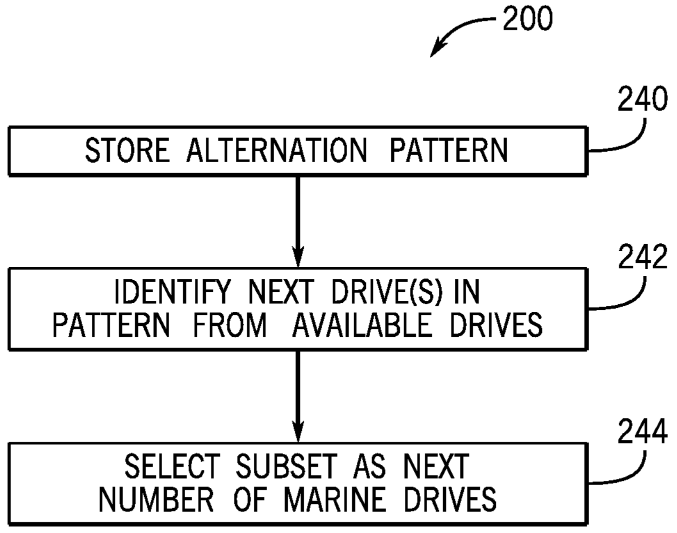

FIG. 10 depicts exemplary steps for selecting the marine drives to be included in the subset where selection is made based on an alternation pattern. The alternation pattern is stored at step 240, which is an order for selecting and running the marine drives 11-13 in generator mode. The next one or more marine drives in the pattern, based on the number of marine drives to be included in the subset, are identified from the available marine drives at step 242. The subset is then selected at step 244 as the next number of available marine drives. To provide an explanatory example referencing the embodiment at FIG. 1, the alternation pattern may be set as the starboard drive 11, the center drive 12, and then the port drive 13. If the center marine drive was last run in generator mode and a single marine drive is to be included in the subset, then the port marine drive 13 will be selected next time the system 10 is operated in generator mode (provided it is available). If instead two marine drives are to be selected, then the next operation in generator mode ill include the port marine drive 13 and the starboard marine drive 11 (provided both are available). If however the starboard marine drive is trimmed up and thus unavailable, then the port marine drive 13 and the center marine drive 12 would be selected as the next two available marine drives in the alternation pattern. A person having ordinary skill in the art will understand in view of the present disclosure that the alternation pattern may take various forms depending on the number and types of marine drives on the vessel 2.

Figure 11:
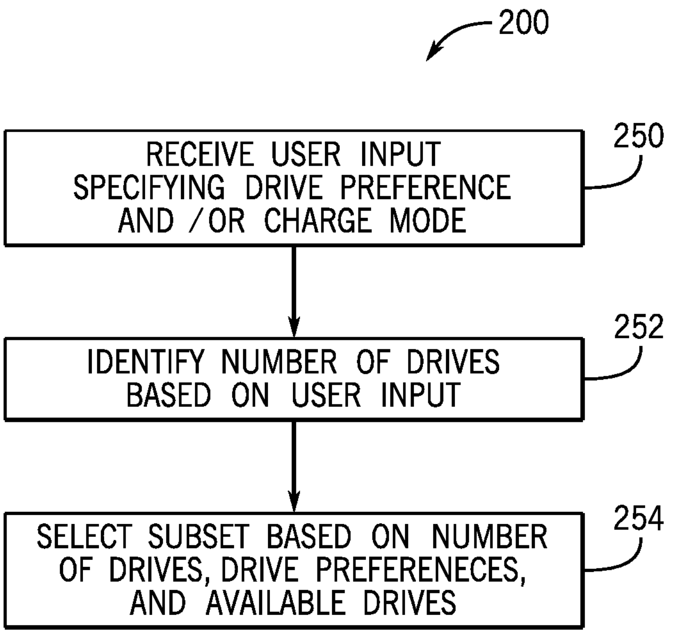

FIG. 11 depicts another embodiment of steps for selecting the subset of marine drives from the available marine drives. User input is received at step 250 specifying drive preference and/or charge mode. As explained above, the control system 40 may include one or user input devices by which the user can select marine drives for operation in the generator mode, such as user interface 48, helm controllers 47, and/or key switches 51-53. In one embodiment, the system may be configured to for user selection of marine drives to be available for operating in the generator mode by positioning the key switch 51-53 for the respective marine drive 11-13 in an on position. Thus, the user-selected available marine drives for operation in the generator mode are those with a key switch 51-53 in the on position. Alternatively or additionally, the system may be configured such that a user can select one or more marine drives to be made unavailable for operation in the generator mode by trimming up the respective marine drive out of the water. In still other embodiments, the system may be configured such that the user can select one or more marine drives to be available, or selection of marine drives to be unavailable, via the user interface 48. Alternatively or additionally, the helm devices, such as user interface 48, may be configured to allow a user to select a charge mode, such as the fast charge mode, quiet charge mode, or efficiency charge mode described above.

The user input is received at step 250 and then the number of drives for inclusion in the subset is determined at step 252. The number of drives may be determined, for example, based on the user input, such as a reference indicating the number of drives to be used or a charge mode selection by the user. For example, as described above with respect to the embodiment at FIG. 8, selection of the fast charge mode may dictate utilizing all available marine drives, whereas selection of a quiet mode or an efficiency mode may indicate selection of only one marine drive for operation in the generator mode. The marine drives to be operated in the generator mode are selected at step 254 based on the number of drives needed, the drive preference specified by the user input, and which drives are available (e.g., trimmed down into the water and not having any engine fault).

In still other mode embodiments, the subset of the plurality of marine drives may be selected based on a combination factors, such as based on a combination of the running and or generator hours, an alternation pattern, and user input.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A marine propulsion system for a marine vessel, comprising:

an engine effectuating rotation of an output shaft;

at least one battery configured to power a marine vessel load;

an alternator having a rotor that is driven into rotation by the output shaft and that outputs a charge current to the at least one battery;

a control system configured to operate the engine in a propulsion mode utilizing a set of propulsion parameters to rotate a propulsor to propel the marine vessel and a generator mode in which the engine is operated using a set of generator parameters to charge the at least one battery while the marine vessel remains stationary, wherein the control system is further configured to:

receive a generator mode command to start the engine in the generator mode; and operate the engine in accordance with at least one of the set of generator parameters to charge the at least one battery while a shift system of the marine propulsion system is locked in a neutral position such that the propulsor cannot be engaged and the marine vessel remains stationary.

2. The marine propulsion system of claim 1, wherein the marine propulsion system further comprises a propulsion spark timing map associated with the propulsion mode and a generator spark timing map associated with the generator mode, and wherein operating the engine in accordance with at least one of the set of generator parameters comprises operating the engine according to the generator spark timing map.

3. The marine propulsion system of claim 1, wherein the marine propulsion system further comprises a propulsion fuel delivery map associated with the propulsion mode and a generator fuel delivery map associated with the generator mode, and wherein operating the engine in accordance with at least one of the set of generator parameters comprises operating the engine according to the generator fuel delivery map.

4. The marine propulsion system of claim 1, wherein the engine comprises a plurality of cylinders, and wherein operating the engine in accordance with at least one of the set of generator parameters comprises a cylinder deactivation pattern for the plurality of cylinders.

5. The marine propulsion system of claim 4, wherein the cylinder deactivation pattern comprises a number of deactivated cylinders.

6. The marine propulsion system of claim 4, wherein the cylinder deactivation pattern comprises locations of deactivated cylinders.

7. The marine propulsion system of claim 1, wherein the control system is further configured to calculate operational hours of the engine.

8. The marine propulsion system of claim 7, wherein the operational hours of the engine comprises a sum of propulsion mode hours and discounted generator mode hours.

9. The marine propulsion system of claim 1, wherein locking the shift system of the marine propulsion system in a neutral position comprises a mechanical locking device or an electronic locking device.

10. The marine propulsion system of claim 1, wherein the marine propulsion system further comprises a propulsion fault manager associated with the propulsion mode and a generator fault manager associated with the generator mode, and wherein operating the engine in accordance with at least one of the set of generator parameters comprises operating the engine according to the generator fault manager.

11. The marine propulsion system of claim 10, wherein the generator fault manager is configured to override a lever position fault response.

12. The marine propulsion system of claim 1, wherein the marine propulsion system further comprises a propulsion cooling system mode associated with the propulsion mode and a generator cooling system mode associated with the generator mode, and wherein operating the engine in accordance with at least one of the set of generator parameters comprises operating the engine according to the generator cooling system mode.

13. The marine propulsion system of claim 12, wherein the generator cooling system mode comprises deactivating at least one cooling passage within the engine.

14. The marine propulsion system of claim 12, wherein the engine comprises an oil sump, and wherein the generator cooling system mode comprises activation of an oil heater in the oil sump.

15. The marine propulsion system of claim 1, further comprising a user input device that is communicably coupled to the control system, wherein the command to start the engine in the generator mode is based on a user selection received at the user input device.

16. The marine propulsion system of claim 1, wherein the command to start the engine in the generator mode is automatically generated based on an electrical power demand from the marine vessel load.

17. The marine propulsion system of claim 1, wherein the command to start the engine in the generator mode is automatically generated based on a low battery power condition in the at least one battery.

18. The system of claim 1, wherein the set of generator parameters is configured to provide different spark timing control, fuel delivery control, cylinder activation pattern, engine RPM control, and/or cooling system control than the set of propulsion parameters.

19. A method of operating a marine propulsion system for a marine vessel, comprising:

providing a control system configured to operate an engine of the marine vessel in a propulsion mode utilizing a set of propulsion parameters to rotate a propulsor to propel the marine vessel and a generator mode in which the engine is operated using a set of generator parameters to charge at least one battery while the marine vessel remains stationary;

receiving a generator mode command to start the engine in the generator mode; and operating the engine in accordance with at least one of the set of generator parameters to charge the at least one battery while a shift system of the marine propulsion system is locked in a neutral position such that the propulsor cannot be engaged and the marine vessel remains stationary.

20. The method of claim 19, wherein the set of generator parameters comprises at least one of a spark timing map, a fuel delivery map, and an engine cylinder deactivation pattern.

21. The method of claim 19, further comprising:

calculating operational hours of the engine, wherein the operational hours of the engine comprises a sum of propulsion mode hours and discounted generator mode hours.

22. The method of claim 19, wherein the set of generator parameters is configured to provide different spark timing control, fuel delivery control, cylinder activation pattern, engine RPM control, and/or cooling system control than the set of propulsion parameters.

* * * * *